Feb. 20, 1934.    J. G. MATTHEWS    1,947,531
REAMER
Filed Oct. 29, 1931
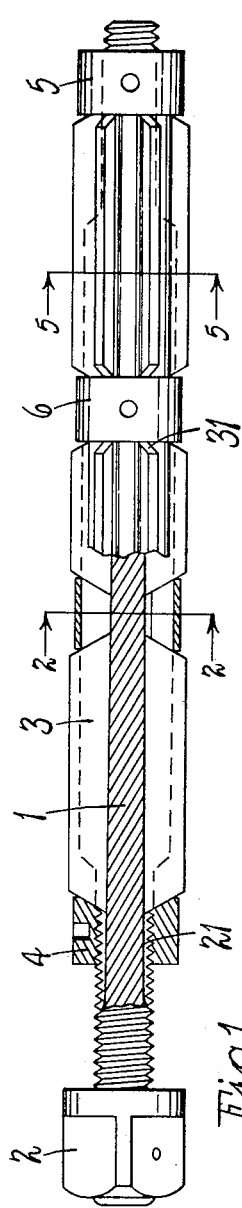
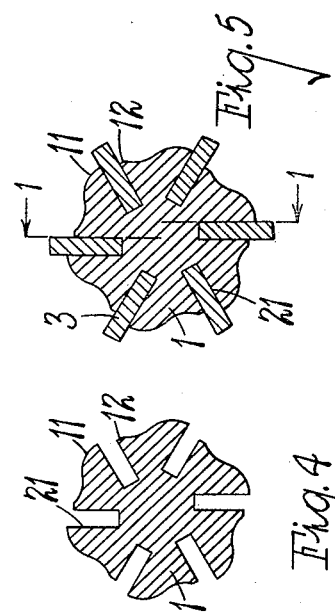
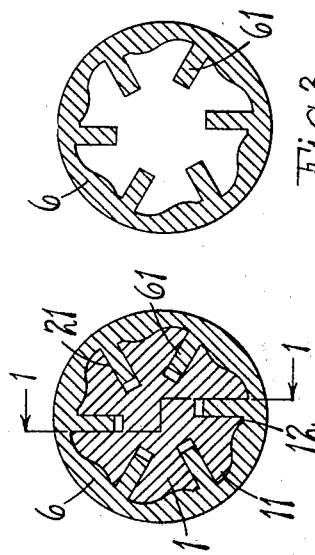
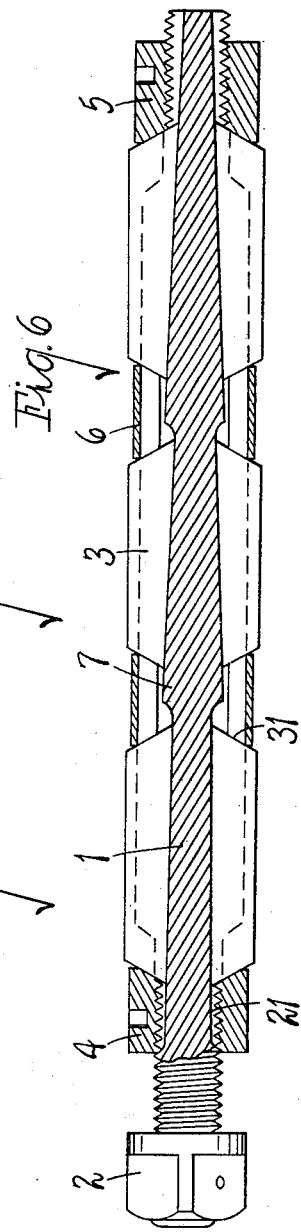
INVENTOR
John G. Matthews
BY
Chappell & Earl
ATTORNEYS Patented Feb. 20, 1934

1,947,531

UNITED STATES PATENT OFFICE 1,947,531

REAMER

John G. Matthews, Berea, Ohio

Application October 29, 1931. Serial No. 571,795

2 Claims. (Cl. 77—75.5)

This invention relates to piston pin hole reamers of the adjustable blade type.

The objects of the invention are:

First, to provide a reamer of the class with sections of independently supported and adjustable blades on a central spindle with tapered blade seats.

Second, to provide such a structure with independent separate seats for each section.

Third, to provide improved means of retaining the blades on such spindle and adjusting the same effectively.

Objects relating to details and economies of my invention will appear from the description to follow. The invention is defined and pointed out in the claims.

A structure which is a preferred embodiment of my invention is illustrated in the accompanying drawing, in which:

Fig. 1 is a detail view of a reamer embodying the features of my invention, partly in longitudinal section on a line corresponding to line 1—1 of Figs. 2 and 5.

Fig. 2 is an enlarged detail transverse sectional view on line 2—2 of Fig. 1, through one of my improved retaining collars and the central stem.

Fig. 3 is a sectional view like Fig. 2 through the collar alone.

Fig. 4 is a detail sectional view like Fig. 2 through the central stem as it is engaged by the said collar.

Fig. 5 is an enlarged detail transverse sectional view on line 5—5 of Fig. 1, showing the details of the arrangements of the blades in the said stem.

Fig. 6 is a detail longitudinal sectional view of a modified form of my invention in which there are separate sections or areas of the stem with tapered blade seats to hold the blades to each section of the reamer.

The parts will be identified by their numerals of reference which are the same in all the views.

1 is the central stem with squared head 2 to serve to receive a handle, chuck or brace. This is provided with longitudinal slots 21. In the said slots in the stem are disposed tapering blades 3. Cupped nuts 4 and 5 are screw threaded on reduced end portions at each end and are adjustable to retain the said blades. The stems are formed in relation to the slots to back the blades by a heavy portion 11, the front being cut down at 12 to give clearance for the cutters.

The blades are in short sections and are supported by special collars 6 which conform to the stem and are provided with inwardly projecting lug blades 61 to enter the longitudinal slots and engage the tapered ends 31 of the said blades 3. The blades may be formed with cutting edges or they may be ground to serve as guide blades for guiding the reamer.

The modification appearing in Fig. 6 differs from that in Fig. 1 in that there are a series of cones 7, there being a cone for each reamer section formed by the tapered seats.

Having thus described my invention, what I claim as new and desire to secure by Letters Patent, is:

1. In a reamer having adjustable blades, the combination of a central stem with tapered blade seats reduced and screw threaded at its ends and having longitudinal slotted ways to serve as seats for reamer blades, a series of adjustable reamer blades beveled at their ends and adjustably seated in said ways, and adjustable along the same, collars intermediate the said series of blades with inwardly-projecting blade-like lugs conforming to the way in said stem, and beveled to correspond to and to engage the beveled ends of said blades, and cup nuts on the ends of said stem to embrace and engage the beveled ends of the adjacent blades whereby the longitudinal adjustment by said nuts varies the dimensions of the reamer sections.

2. In a reamer having adjustable blades, the combination of a central stem made up of a series of sections with tapered blade seats screw threaded at its ends and having longitudinal slotted ways corresponding to each section to serve as seats for reamer blades, a series of adjustable reamer blades beveled at their ends and adjustably seated in said ways, and adjustable along the same, collars intermediate the said series of blades with inwardly-projecting blade-like lugs conforming to the way in said stem, and beveled to correspond to and to engage the beveled ends of said blades, and cup nuts on the ends of said stem to embrace the adjacent blades whereby the longitudinal adjustment by said nuts varies the dimensions of the reamer sections.

JOHN G. MATTHEWS.